(12) United States Patent
Hunn et al.

(10) Patent No.: US 10,475,047 B2
(45) Date of Patent: Nov. 12, 2019

(54) METHOD AND APPARATUS FOR DELIVERING TARGETED CONTENT TO WEBSITE VISITORS

(75) Inventors: Andreas J. Hunn, Ashburn, VA (US); Nicolas Tabbal, Vienna, VA (US); Sara Taylor, Arlington, VA (US); John Brady, Alexandria, VA (US)

(73) Assignee: Resonate Networks, Inc., Reston, VA (US)

( * ) Notice: Subject to any disclaimer, the term of this patent is extended or adjusted under 35 U.S.C. 154(b) by 184 days.

(21) Appl. No.: 12/644,892

(22) Filed: Dec. 22, 2009

(65) Prior Publication Data

US 2011/0054983 A1 Mar. 3, 2011

Related U.S. Application Data

(60) Provisional application No. 61/238,004, filed on Aug. 28, 2009.

(51) Int. Cl.
*G06Q 30/02* (2012.01)
*G06F 16/31* (2019.01)
(Continued)

(52) U.S. Cl.
CPC ........... *G06Q 30/02* (2013.01); *G06F 16/313* (2019.01); *G06Q 10/063* (2013.01); *G06Q 10/10* (2013.01);
(Continued)

(58) Field of Classification Search
CPC ............................... G06Q 10/00; G06Q 30/02
(Continued)

(56) References Cited

U.S. PATENT DOCUMENTS 5,893,098 A 4/1999 Peters et al.
6,014,638 A 1/2000 Burge et al.
(Continued)

FOREIGN PATENT DOCUMENTS

CN 101079063 11/2007
CN 101253499 A 8/2008
(Continued)

OTHER PUBLICATIONS

Non-Final Office Action issued by the United States Patent and Trademark Office for U.S. Appl. No. 12/942,469, dated Jan. 16, 2013, 19 pages.
(Continued)

*Primary Examiner* — Robert D Rines

(57) ABSTRACT

A method of selecting a website for delivery of targeted content to an audience member computer based on attitude values associated with audience members who participate in a computer implemented survey is disclosed. The survey response information, as well as website visitation information, and demographic information associated with the audience members may be collected and stored in a central database. An attitude value may be determined from the survey response information and/or the other information for the audience members. The attitude value may indicate the audience member's view about an issue, topic, product, service or the like. The attitude value in conjunction with other website visitation information may be used to select a website for delivery of the targeted content to the audience members.

18 Claims, 16 Drawing Sheets

(51) Int. Cl.
*G06Q 10/06* (2012.01)
*G06Q 10/10* (2012.01)

(52) U.S. Cl.
CPC ..... *G06Q 30/0244* (2013.01); *G06Q 30/0254* (2013.01)

(58) Field of Classification Search
USPC ...................... 705/7.11–7.42, 7.14
See application file for complete search history.

(56) References Cited

U.S. PATENT DOCUMENTS

| | | | |
|---|---|---|---|
| 6,131,110 A | 10/2000 | Bates et al. | |
| 6,718,551 B1 | 4/2004 | Swix et al. | |
| 7,006,979 B1 | 2/2006 | Samra et al. | |
| 7,082,401 B2 | 7/2006 | Behrens et al. | |
| 7,240,092 B2 | 7/2007 | Houghton et al. | |
| 7,337,127 B1 | 2/2008 | Smith et al. | |
| 7,424,439 B1* | 9/2008 | Fayyad et al. | 705/7.33 |
| 7,565,157 B1 | 7/2009 | Ortega et al. | |
| 7,644,134 B2 | 1/2010 | Cohen et al. | |
| 7,647,283 B2* | 1/2010 | Singh et al. | 706/12 |
| 7,769,623 B2 | 8/2010 | Mittel et al. | |
| 7,788,132 B2* | 8/2010 | Desikan et al. | 705/14.6 |
| RE41,754 E | 9/2010 | Knight | |
| 7,861,260 B2 | 12/2010 | Shkedi | |
| 8,010,527 B2* | 8/2011 | Denoue et al. | 707/726 |
| 2001/0034637 A1 | 10/2001 | Lin et al. | |
| 2002/0059094 A1 | 5/2002 | Hosea et al. | |
| 2002/0133500 A1 | 9/2002 | Arlein et al. | |
| 2003/0033405 A1 | 2/2003 | Perdon et al. | |
| 2003/0074252 A1 | 4/2003 | Chandler-Pepelnjak et al. | |
| 2003/0101451 A1 | 5/2003 | Bentolila et al. | |
| 2003/0171990 A1 | 9/2003 | Rao et al. | |
| 2004/0204983 A1 | 10/2004 | Shen et al. | |
| 2005/0166233 A1 | 7/2005 | Beyda et al. | |
| 2005/0246736 A1 | 11/2005 | Beyda et al. | |
| 2006/0230053 A1 | 10/2006 | Eldering | |
| 2007/0033084 A1 | 2/2007 | Mascarenhas | |
| 2007/0112630 A1 | 5/2007 | Lau et al. | |
| 2007/0112735 A1 | 5/2007 | Holloway et al. | |
| 2007/0198937 A1 | 8/2007 | Paris | |
| 2007/0208728 A1 | 9/2007 | Zhang et al. | |
| 2007/0239535 A1 | 10/2007 | Koran et al. | |
| 2008/0005101 A1* | 1/2008 | Chandra | 707/5 |
| 2008/0090513 A1 | 4/2008 | Collins et al. | |
| 2008/0154707 A1 | 6/2008 | Mittel et al. | |
| 2008/0172243 A1 | 7/2008 | Kelly | |
| 2008/0181225 A1 | 7/2008 | Zampiello | |
| 2008/0189169 A1* | 8/2008 | Turpin et al. | 705/10 |
| 2008/0195462 A1 | 8/2008 | Magdon-Ismail et al. | |
| 2008/0195468 A1 | 8/2008 | Malik | |
| 2008/0201472 A1 | 8/2008 | Bistriceanu et al. | |
| 2008/0222283 A1 | 9/2008 | Ertugrul et al. | |
| 2008/0243610 A1 | 10/2008 | Ragno et al. | |
| 2008/0259906 A1 | 10/2008 | Shkedi et al. | |
| 2008/0306830 A1 | 12/2008 | Lasa et al. | |
| 2009/0049468 A1 | 2/2009 | Shked | |
| 2009/0132347 A1 | 5/2009 | Anderson et al. | |
| 2009/0171763 A1 | 7/2009 | Dong et al. | |
| 2009/0187593 A1 | 7/2009 | Mei et al. | |
| 2009/0204706 A1 | 8/2009 | Ertugrul et al. | |
| 2009/0216616 A1 | 8/2009 | Wang et al. | |
| 2009/0228335 A1* | 9/2009 | Niyogi et al. | 705/10 |
| 2009/0271228 A1 | 10/2009 | Bilenko et al. | |
| 2009/0271259 A1 | 10/2009 | Fish | |
| 2009/0287683 A1 | 11/2009 | Bennett | |
| 2009/0327026 A1 | 12/2009 | Bistriceanu et al. | |
| 2010/0004977 A1 | 1/2010 | Marci et al. | |
| 2010/0004997 A1 | 1/2010 | Mehta et al. | |
| 2010/0030648 A1 | 2/2010 | Manolescu et al. | |
| 2010/0050098 A1 | 2/2010 | Turner | |
| 2010/0076847 A1 | 3/2010 | Heller | |
| 2010/0161385 A1 | 6/2010 | Karypis et al. | |
| 2010/0179875 A1 | 7/2010 | Yuki | |
| 2010/0191680 A1 | 7/2010 | Lee et al. | |
| 2010/0223215 A1 | 9/2010 | Karypis et al. | |
| 2010/0262487 A1 | 10/2010 | Edwards et al. | |
| 2010/0325659 A1 | 12/2010 | Shkedi | |
| 2011/0004504 A1* | 1/2011 | Ives et al. | 705/10 |
| 2011/0010243 A1 | 1/2011 | Wilburn et al. | |
| 2011/0025037 A1 | 2/2011 | Wilen | |
| 2011/0035228 A1 | 2/2011 | Li et al. | |
| 2011/0054983 A1 | 3/2011 | Hunn et al. | |
| 2011/0119278 A1 | 5/2011 | Hunn et al. | |
| 2012/0191815 A1 | 7/2012 | Hunn | |
| 2012/0192214 A1 | 7/2012 | Hunn | |

FOREIGN PATENT DOCUMENTS

| | | |
|---|---|---|
| EP | 2334074 | 6/2011 |
| JP | 2009-289068 | 12/2009 |
| JP | 2013-515322 A | 5/2013 |
| WO | WO 02/23444 | 3/2002 |
| WO | WO 2007/002785 A2 | 1/2007 |
| WO | WO 2007/048063 A2 | 4/2007 |
| WO | 2010057265 | 5/2010 |

OTHER PUBLICATIONS

Final Office Action issued by the United States Patent and Trademark Office for U.S. Appl. No. 12/942,469, dated Oct. 9, 2013, 19 pages.

Non-Final Office Action issued by the United States Patent and Trademark Office for U.S. Appl. No. 12/942,469, dated Jun. 19, 2014, 21 pages.

Non-Final Office Action issued by the United States Patent and Trademark Office for U.S. Appl. No. 12/942,469, dated Apr. 10, 2015, 24 pages.

Non-Final Office Action issued by the United States Patent and Trademark Office for U.S. Appl. No. 12/942,469, dated Feb. 10, 2016, 31 pages.

Non-Final Office Action issued by the United States Patent and Trademark Office for U.S. Appl. No. 12/942,469, dated Mar. 23, 2017, 18 pages.

Non-Final Office Action issued by the United States Patent and Trademark Office for U.S. Appl. No. 13/348,454, dated Feb. 25, 2013, 25 pages.

Final Office Action issued by the United States Patent and Trademark Office for U.S. Appl. No. 13/348,454, dated Sep. 10, 2013, 25 pages.

Non-Final Office Action issued by the United States Patent and Trademark Office for U.S. Appl. No. 13/348,454, dated Dec. 17, 2014, 27 pages.

Final Office Action issued by the United States Patent and Trademark Office for U.S. Appl. No. 13/348,454, dated Sep. 2, 2015, 17 pages.

Non-Final Office Action issued by the United States Patent and Trademark Office for U.S. Appl. No. 13/365,020, dated Apr. 1, 2013, 17 pages.

Final Office Action issued by the United States Patent and Trademark Office for U.S. Appl. No. 13/365,020, dated Nov. 5, 2013, 18 pages.

Non-Final Office Action issued by the United States Patent and Trademark Office for U.S. Appl. No. 13/365,020, dated Sep. 23, 2014, 30 pages.

Final Office Action issued by the United States Patent and Trademark Office for U.S. Appl. No. 13/365,020, dated Jul. 15, 2015, 34 pages.

Non-Final Office Action issued by the United States Patent and Trademark Office for U.S. Appl. No. 13/365,020, dated Jan. 5, 2017, 12 pages.

Office Action—4th—Issued by Chinese Patent Office for Application No. 201080048785.X, dated Aug. 16, 2016, 7 pages (includes English Translation).

Office Action—Communication issued by the European Patent Office for Application No. 10812662.4, dated Sep. 20, 2017, 7 pages.

(56) References Cited

OTHER PUBLICATIONS

Extended European Search Report issued by the European Patent Office for Application No. 10812662.4, dated Sep. 5, 2014, 6 pages.
Notification of Reexamination issued by the Chinese Patent Office for Application No. 201080056839.5, dated May 27, 2017, 23 pages.
Decision of Rejection issued by the Chinese Patent Office for Application No. 201080056839.5, dated Jul. 4, 2016, 22 pages.
Extended European Search Report issued by the European Patent Office for Application No. 10839962.7, dated Sep. 8, 2014, 7 pages.
Communication Pursuant to Article 94(3) EPC issued by the European Patent Office for Application No. 10839962.7, dated Feb. 10, 2017, 6 pages.
Decision of Rejection issued by the Chinese Patent Office for Application No. 201280034894.5, dated Mar. 13, 2017, 40 pages includes English translation.
Notice of Second Office Action issued by the Chinese Patent Office for Application No. 201280034894.5, dated Sep. 2, 2016, 48 pages includes English translation.
Extended European Search Report issued by the European Patent Office for Application No. 12811389.1, dated Mar. 25, 2015, 13 pages.
Communication Pursuant to Article 94(3)EPC issued by the European Patent Office for Application No. 12811389.1, dated Dec. 22, 2016, 9 pages.
Office Action issued by the Japanese Patent Office for Application No. 2014-520319, dated Jan. 20, 2016, 5 pages including 2 page English translation).
Office Action issued by the Chinese Patent Office for Application No. 201280045921.9, dated Jul. 4, 2016, 46 pages includes English translation.
Extended European Search Report issued by the European Patent Office for Application No. 12814274.2, dated Feb. 5, 2015, 7 pages.
International Search Report and Written Opinion issued by the International Searching Authority for Application No. PCT/US2010/046986, dated Oct. 25, 2010, 9 pages.
International Search Report and Written Opinion issued by the International Searching Authority for Application No. PCT/US2010/057639, dated Feb. 1, 2011, 7 pages.
International Search Report and Written Opinion issued by the International Searching Authority for Application No. PCT/US2012/046453, dated Sep. 28, 2012, 11 pages.
International Search Report and Written Opinion issued by the International Searching Authority for Application No. PCT/US2012/046473, dated Oct. 5, 2012, 8 pages.

* cited by examiner

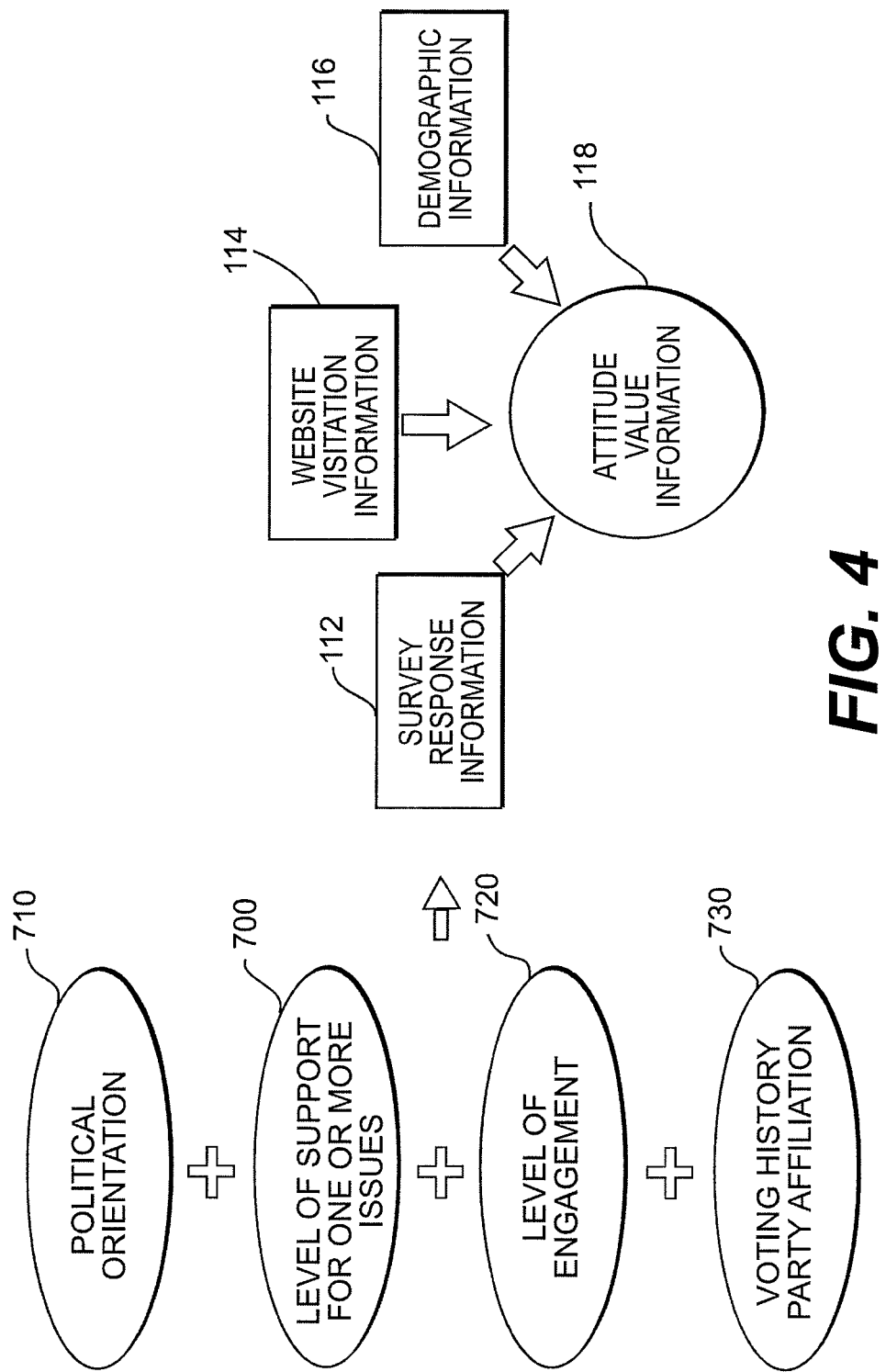

General Engagement Action Values

Level of effort and commitment determine each level's value

724

| Action Value | Description (722) |
|---|---|
| 1 | Closely followed a particular issue and searched for information about it from acquaintances in the media or online |
| 1 | Contributed your thoughts about an issue online through comment boxes, blogs, or chat rooms |
| 1 | Voted for a political candidate or political party based primarily on your views on a specific issue |
| 1 | Communicated with a state, local, or national politician about an issue |
| 1 | Signed a petition – People have different levels of involvement in politics and public policy issues |
| 2 | Been an active member of any group that tries to influence public policy or government |
| 2 | Contributed to a political candidate or party |
| 2 | Attended a public meeting on town, or school affairs |
| 2 | Attended a political rally, speech, or organized protest of any kind |
| 2 | Worked for a political party |
| 3 | Specifically bought a product or service form a company whose involvement with an issue you approve of |
| 3 | Bought or avoided buying a product because of the company's involvement with a public issue |
| 3 | Bought or sold stock in a company because of its position or involvement in a particular issue |
| 4 | Speaking at a public meeting, or in a letter to the editor of a newspaper, magazine, or online forum |
| 4 | Written an article for a newspaper, magazine or online forum |
| 4 | Made a speech about a political, or public policy issue |

*Fig. 5*

General Engagement Scale

| | Percent Of Online Population | Criteria Description |
|---|---|---|
| Non-Engaged 0 | 17% | Not taking any actions |
| Low 1 - 6 | 42% | Not taking Level 3 or 4 actions or doing them in non-cohesive and uncalculated fashion |
| Moderate 7 - 12 | 23% | Taking lots of Level 1 or 2 actions or doing few across all levels |
| High 13 - 38 | 18% | Taking many actions across all levels in a coordinated fashion |

Political Engagement Scale
Progressively additive levels and logical construction

*728*

| Value (734) | Level (732) | Definition (730) |
|---|---|---|
| 1 | Issue Voters (IV1) | Registered to vote<br>Voted in half or more elections<br>Vote based on issues |
| 2 | Informed Voters (IV2) | IV1 PLUS<br>1) Watch or listen to news/media shows at least a few times a month<br>2) Seek info on issues |
| 4 | Invested Voters (IV3) | IV2 PLUS<br>1) Donate to political party or advocacy group |
| 8 | Influential Voters (IV4) | IV3 PLUS<br>1) Contribute thoughts on-line or in print<br>2) Join group or attended a public meeting or political rally/speech/protest or signed a petition or worked for political party or communicate with politician or written an article or made a speech. |

*Fig. 7*

Advocacy Engagement Action Categories
Group activities by type and analyze these types in order to build the Advocacy Engagement hierarchy

736

| Private Actions/Minimal Involvement (Factor 1)<br>- Sign a Petition (56%)<br>- Vote for a Candidate Based on issue (55%)<br>- Search for Information (43%)<br>- Contact a politician (39%)<br>- Contribute Thoughts On-Line (29%)<br><br>738 | Active Involvement (Factor 2)<br>- Attended a public meeting on town or school affairs (26%)<br>- Contribute Money to Group to Advocate Issue (21%)<br>- Contribute to a Political Candidate or Party (20%)<br>- Active member of group that tries to influence policy (13%)<br>- Attended a political rally, speech or protest (14%)<br>- Worked for a political party (8%)<br><br>740 |
|---|---|
| Integrated Political Action (Factor 3)<br>- Bought or avoided buying product because of company's involvement with a public issue (31%)<br>- Buy product/service from company involved with issue approve of (20%)<br>- Bought or sold stock in a company because of it's position or involvement in a particular issue (4%)<br><br>742 | Private Actions/Minimal Involvement (Factor 4)<br>- Speaking at a public meeting, or in a letter to the editor of a newspaper or magazine or by calling into a live Radio or TV show (14%)<br>- Written an article for a newspaper, magazine or online forum (7%)<br>- Made a speech about a political or public policy issue (3%)<br><br>744 |

*Fig. 8*

Advocacy Engagement Scale

| Value (750) | Level (748) | Definition (752) |
|---|---|---|
| 0 | Non-Engaged | • Engages in no activities |
| 1 | Privately Involved | • Engages in at least one private, low-involvement/minimally influential action such as "Sign a petition," "Search for information," or "Buy product/service from company involved with issue approve of"<br>• No combination of activities across Engagement Factor categories |
| 2 | Actively Involved | • Engages in at least one public, high-involvement/influential action such as "attended a political rally, speech or protest" or "Written an article for a newspaper, magazine or online forum"<br>• Combination of activities across Engagement Factor categories that don't exceed 2 activities such as partaking in a Private Action activity (e.g. "Sign a petition) and Active Involvement activity (e.g. "Attended a political rally") |
| 3 | Advocate | • Engages in at least one activity from all Engagement Factor categories except for Factor 4 (Public/High Level Involvement)<br>• Maximum involvement but with only moderate influence (e.g. concurrently doing "Contribute thoughts on-line," "Contribute money to group to advocate issue," and "Bought or sold stock in a company because of its position or involvement in a particular issue". |
| 4 | Super Advocate | • Engages in combinations of activities from all Engagement Factor categories<br>• Maximum involvement and influence (e.g. concurrently doing "Vote for a candidate based on issue," "Worked for a political party," and "Speakign at a public meeting" |

*Fig. 9*

Description of The Weighting Process

| | |
|---|---|
| 800 | Assign each participating audience member in the same age group the same audience member weight |
| 801 | Determine demographic distribution of participating audience members by age group during a first preselected time period |
| 802 | Determine demographic distribution of the online population by age group during the first preselected time period |
| 804 | Calculate weight factor for each age group by dividing distribution of online population by the distribution of participating audience members |
| 806 | Determine demographic distribution of participating audience members by gender during the first preselected time period |
| 808 | Determine demographic distribution of the online population by gender during the first preselected time period |
| 810 | Calculate weight factor for each gender by dividing distribution of online population by the distribution of participating audience members |
| 812 | Determine demographic distribution of participating audience members by household income during the first preselected time period |
| 814 | Determine demographic distribution of the online population by household income during the first preselected time period |
| 816 | Calculate weight factor for each household income group by dividing distribution of online population by the distribution of participating audience members |
| 818 | Determine demographic distribution of participating audience members by census region during the first preselected time period |
| 820 | Determine demographic distribution of the online population by census region during the first preselected time period |
| 822 | Calculate weight factor for each census region group by dividing distribution of online population by the distribution of participating audience members |
| 824 | Determine distribution of participating audience members as Heavy/Medium/Light Internet user during first preselected time period |
| 826 | Determine distribution Light/Medium/Heavy Internet users for the online population during first preselected time period |

FIG. 10 A

Description of The Weighting Process (Continued)

| | |
|---|---|
| 828 | Calculate weight factor for each usage intensity group (Light/Medium/Heavy) by dividing distribution of online population by the distribution of participating audience members |
| 830 | Check if the demographic distribution of participating audience members by age is approximately the same as still similar to that of the online population |
| 832 | If distributions are not approximately the same, repeat steps 800 - 804 |
| 834 | Check if the demographic distribution of participating audience members by gender is approximately the same as that of the online population |
| 836 | If distributions are not approximately the same, repeat steps 806 - 810 |
| 838 | Check if the demographic distribution of participating audience members by household income is approximately the same as that of the online population |
| 840 | If distributions are not approximately the same, repeat steps 812 - 816 |
| 842 | Check if the demographic distribution of participating audience members by census region is approximately the same as that of the online population |
| 844 | If distributions are not approximately the same, repeat steps 818 -822 |
| 846 | Check if the distribution of participating audience members by usage intensity is approximately the same as that of the online population |
| 848 | If distributions are not approximately the same, repeat steps 824 - 828 |
| 850 | Calculate sum of weights for participating audience members for each preselected time periods |
| 852 | Determine the size of the total online population for all preselected time periods combined |
| 854 | Calculate a projection factor for each participating audience member as: size of the online population across all preselected time periods (step 852) divided by the sum of weights (step 850) |
| 856 | Calculate projection weights by Multiplying each participating audience member's weight by the projection factor |

FIG. 10 B

Creating the Quality Visitation Index (Continued)

Top 10 QVI Net Support* Sites – Women with Children Under 16 who Support Obesity Legislation

| Website | Support Index to Total: QV SVI | Oppose Index to Total: QV SVI | Net Support Score |
|---|---|---|---|
| The Hunger Site | 288 | 72 | 216 |
| SOAPnet | 244 | 48 | 196 |
| BabyCenter | 239 | 71 | 168 |
| WeddingChannel.com | 215 | 90 | 125 |
| EmploymentGuide.com | 213 | 69 | 144 |
| AOL Mobile | 197 | 34 | 163 |
| TopUSAJobs.com | 190 | 52 | 138 |
| Lyrics.com | 190 | 52 | 138 |
| AmericanGreetings.com MSN Greetings | 190 | 52 | 138 |
| BirthdayAlarm.com | 187 | 90 | 97 |

Fig. 12

| Top 15 QVI Sites – Women with Children Under 16 | |
|---|---|
| Website | Index to Total: QV SVI |
| Teen Magazine | 329 |
| Great American Photo Contest | 298 |
| A Full Cup | 278 |
| Millsberry.com | 271 |
| Babiesonline.com | 265 |
| CafeMom | 261 |
| MyCoupons | 247 |
| Seventeen Magazine | 245 |
| Allure Magazine | 241 |
| Cheatcodes.com | 241 |
| Pointsandprizes.com | 241 |
| Wish Upon A Hero | 226 |
| GirlsGoGames.com | 223 |
| Agame.com | 223 |
| Parents.com | 217 |

| Top 15 QVI Sites – Women with Children Under 16 who Support Obesity Legislation | |
|---|---|
| Website | Index to Total: QV SVI |
| Great American Photo Contest | 369 |
| Agame.com | 290 |
| The Hunger Site | 288 |
| eLearners.com | 261 |
| Arcade Town | 258 |
| Parents.com | 251 |
| SOAPnet | 244 |
| Allure Magazine | 244 |
| GirlsGoGames.com | 240 |
| BabyCenter | 239 |
| SparkPeople | 233 |
| NickJr | 219 |
| Medscape | 215 |
| WeddingChannel.com | 215 |
| EmploymentGuide.com | 213 |

*Fig. 13*

METHOD AND APPARATUS FOR DELIVERING TARGETED CONTENT TO WEBSITE VISITORS

CROSS REFERENCE TO RELATED APPLICATIONS

The present application relates to, and claims the priority on U.S. Provisional Patent Application No. 61/238,004, filed Aug. 28, 2009 and entitled Method and Apparatus for Delivering Targeted Content to Website Visitors.

FIELD OF THE INVENTION

The present invention relates to methods and apparatus for determining one or more optimal websites on which to display targeted content to a plurality of website visitors, referred to as audience members.

BACKGROUND OF THE INVENTION

The Internet is used by advertisers and other content providers to deliver website content, including but not limited to advertisements, to Internet audience members. There is a continuing need to deliver targeted content, meaning content that may be of particular interest to some but not all audience members, to audience members with particular attitudes or views. The ability of content providers and advertisers to select optimal websites for the delivery of targeted content to audience members with particular attitudes has been limited. Further, content providers and advertisers have been unable to select websites for the delivery of targeted content which are both likely to be visited by audience members with particular attitudes while at the same time unlikely to be visited by audience members with opposing attitudes. Accordingly, there is a need for improved methods and systems for delivering targeted content to audience members.

It is an advantage of some, but not necessarily all, embodiments of the present invention to provide methods and systems for selecting websites for the delivery of targeted content to audience members who are likely to have particular attitudes. It is also an advantage of some, but not necessarily all, embodiments of the present invention to provide methods and systems for selecting websites for the delivery of targeted content which are less likely to be visited by audience members who have opposing attitudes to those of the audience members to whom it is desired to deliver the targeted content.

Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicants have developed an innovative method of displaying content on a display connected to an audience member computer based on attitude values determined for audience members who participate in a computer implemented survey, and website visitation information and demographic information for the audience members, the method comprising: receiving at a central database survey response information transmitted over a computer network from participating audience member computers; receiving at the central database website visitation information for the participating audience member computers; receiving at the central database demographic information which is associated with the (i) participating audience members, and (ii) non-participating audience members from whom no survey response information is received; determining an attitude value for each of the participating audience members based on one or more of the survey response information using a non-audience member computer, the website visitation information and the demographic information; determining a Quality Visitation Index (QVI) value for a website from the website visitation information using the non-audience member computer, wherein the QVI value is based on a value selected from the group consisting of: a target group Reach Index, an opposing group Reach Index, a Net Support Score, a minutes per unique visitor Index, a pages per unique visitor Index, an ad clutter Index, a past performance Index, a minutes per page Index, and an ads per page Index; providing the content to the website based on the QVI value for the website; transmitting the content over the computer network to one of said participating or non-participating audience member computers as a result of one of said participating or non-participating audience member computers accessing the website; and displaying the content on the display connected to one of said participating or non-participating audience member computers.

Applicants have developed an innovative method of transmitting content for viewing on a display connected to an audience member computer based on attitude values determined for audience members who participate in a computer implemented survey, and website visitation information and demographic information for the audience members, the method comprising: receiving at a central database survey response information transmitted over a computer network from participating audience member computers; receiving at the central database website visitation information for the participating audience member computers; receiving at the central database demographic information which is associated with the (i) participating audience members, and (ii) non-participating audience members from whom no survey response information is received; determining an attitude value for each of the participating audience members using a non-audience member computer based on one or more of the survey response information, the website visitation information and the demographic information; determining a Quality Visitation Index (QVI) value for a website from the website visitation information and attitude values using the non-audience member computer; providing content to the website based on the QVI value for the website; and transmitting the content over the computer network to one of said participating or non-participating audience member computers as a result of one of said participating or non-participating audience member computers accessing the website.

Applicants have further developed an innovative method of determining content for display on a website, the method comprising: receiving at a central database survey response information transmitted over a computer network from participating audience member computers; receiving at the central database website visitation information for the participating audience member computers; receiving at the central database demographic information which is associated with the (i) participating audience members, and (ii) non-participating audience members from whom no survey response information is received; determining an attitude value for each of the participating audience; determining a Quality Visitation Index (QVI) value for a website from the website visitation information and attitude values; and providing content to the website based on the QVI value for the website.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

FIG. 4 is a schematic diagram illustrating the information components which may be used to determine an attitude value in accordance with an embodiment of the present invention.

FIG. 5 is a chart showing examples of general engagement actions and associated weights in accordance with an embodiment of the present invention.

FIG. 6 is a chart showing examples of general engagement levels and associated descriptions in accordance with an embodiment of the present invention.

FIG. 7 is a chart showing examples of political engagement levels and associated descriptions and values in accordance with an embodiment of the present invention.

FIG. 8 is a chart showing examples of groupings of advocacy engagement actions in accordance with an embodiment of the present invention.

FIG. 9 is a chart showing examples of advocacy engagement levels and associated descriptions and values in accordance with an embodiment of the present invention.

FIGS. 10A and 10B are flow charts illustrating a method of determining projection weights which may be used in accordance with a method embodiment of the present invention.

FIG. 12 includes a chart which illustrates the ranking of websites based on a Net Support Score and QVI values.

FIG. 13 includes two charts which illustrate the ranking of websites based on Quality Visitation Index values.

DETAILED DESCRIPTION OF EMBODIMENTS OF THE INVENTION

Figure 1:
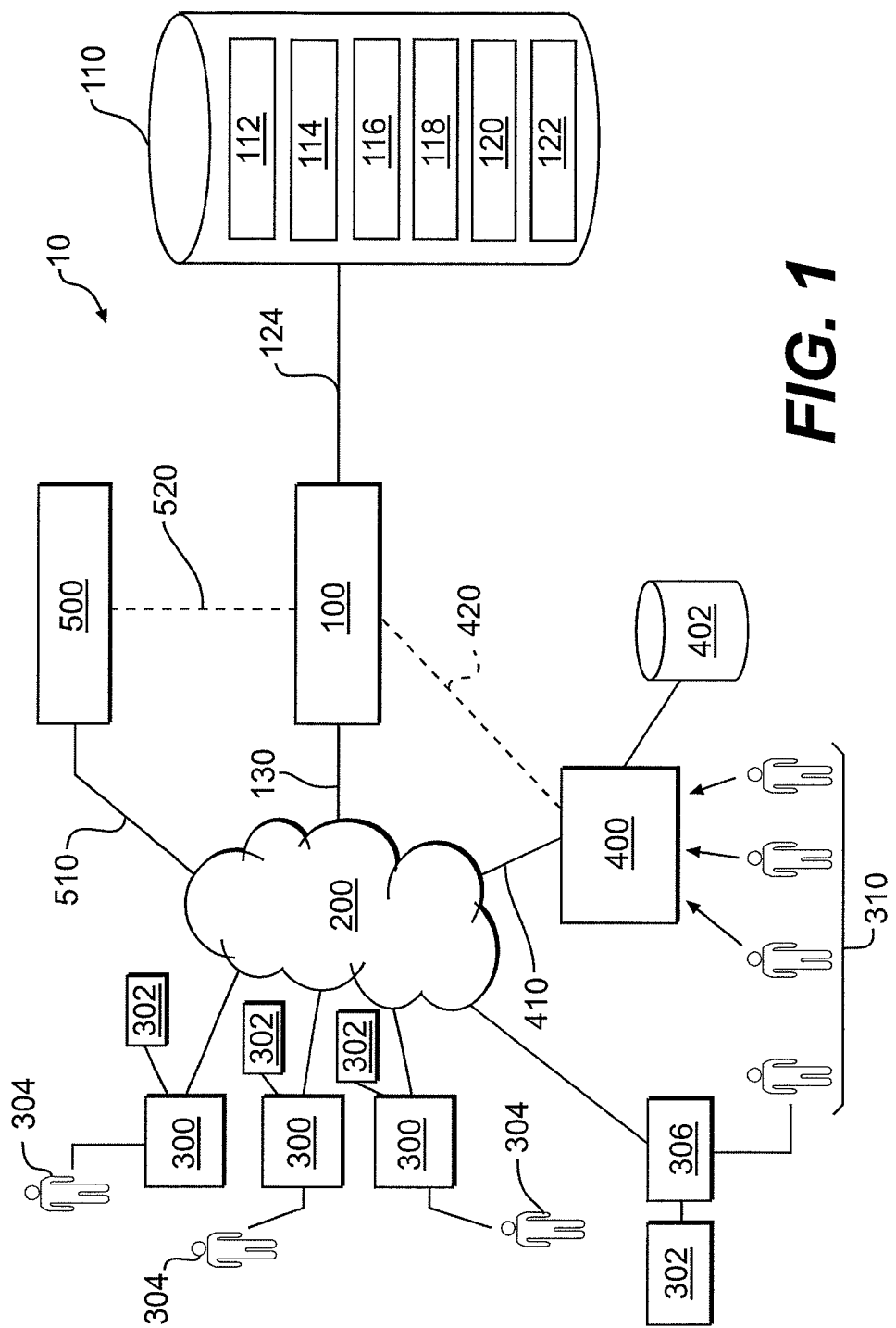
FIG. 1 is a schematic diagram of a computer network configured in accordance with a first embodiment of the present invention.

Reference will now be made in detail to a first embodiment of the present invention, an example of which is illustrated in the accompanying drawings. With reference to FIG. 1, the computer network 10 may include a computer 100 which may be a special use computer with permanent programming to accomplish the methods described herein, or a general use computer programmed with software to permit it to accomplish the methods described herein. The computer 100 may receive information from and store information in a central database 110 via a connection 124.

The computer 100 may also be connected to a network 200 via a connection 130. The network 200 is preferably the Internet. The connections 124 and 130 may be any connection means that permit the transmission of electronic information.

The central database 110 may comprise one or more individual databases and/or database tables for storing information used by the computer 100. The information stored in the central database 110 may include survey response information 112, demographic information 114, website visitation information 116, attitude value information 118, Quality Visitation Index (QVI) information 120, net support score information 122, as well as any other information discussed herein which is capable of being stored in a database. The central database 110 may associate survey response information, demographic information, website visitation information, and attitude value information with an anonymous identifier for a participating audience member and/or participating audience member computer that the information relates to.

The network 200 may be connected to a plurality of participating audience member computers 300, which in turn are connected to displays 302, and which are associated with a plurality of participating audience members 304. The participating audience members 304 may use the computers 300 to access websites from one or more web servers 500 which form part of the world wide web and are connected via the Internet 200. "Participating" audience member computers 300 and "participating" audience members 304 are referred to as "participating" because each is used to participate in providing online survey response information to the computer 100. Visual and audible website content may be transmitted from the one or more web servers 500 and displayed by the participating audience member computers 300 on the displays 302 for viewing and listening by the participating audience members 304. The network 200 may also be connected to a plurality of non-participating audience member computers 306 which are associated with non-participating audience members 310.

Online survey questions stored in the central database 110 may be transmitted from the computer 100 to the participating audience member computers 300. Participating audience members 304 may use their respective computers 300 to transmit online survey response information (i.e., answers to the online survey questions) over the Internet 200 to the computer 100. Website visitation information for the participating audience member computers 300 may also be transmitted for the participating audience members over the Internet 200 to the computer 100. In an alternative embodiment, the online survey questions may be stored in one or more of the third party databases 402 associated with one or more third party computers 400. In such embodiment, the online survey questions may be sent from the third party computers 400 to the participating audience members 304. Thereafter, the survey response information may be sent from the participating audience member computers 300 to the computer 100 directly through the Internet, or alternatively through the one or more third party computers 400.

The computer 100 may also be connected to or otherwise receive information from one or more computers 400 and associated databases or database tables 402 maintained by one or more third party data providers. The third party data provider computers 400 and associated databases or database tables 402 may store demographic information and/or website visitation information relating to a plurality of non-participating audience members 310, and potentially relating to one or more of the plurality of participating audience members 304. The third party data provider computers 400 may receive non-participating audience member demographic information from non-participating audience member computers 306 and/or from other online and/or offline sources. The non-participating audience member demographic information may be transmitted from the third party computers 400 over an Internet connection 410 to the computer 100, or by an alternative means 420 such as a direct electrical signal connection or via electronic information storage media. Examples of third party data providers include, but are not limited to, the Nielsen Company, comScore, and Acxiom.

The computer 100 may be connected to or otherwise receive information from one or more web servers 500. The web servers 500 may transmit website content over connection 510 and the Internet 200 to the participating audience member computers 300 as well as computers 306 and displays associated with the non-participating audience members 310. Information may be transmitted between the computer 100 and the web servers 500 over the Internet 200, or by an alternative means 520 such as a direct electrical signal connection or via electronic information storage media.

Figure 2:
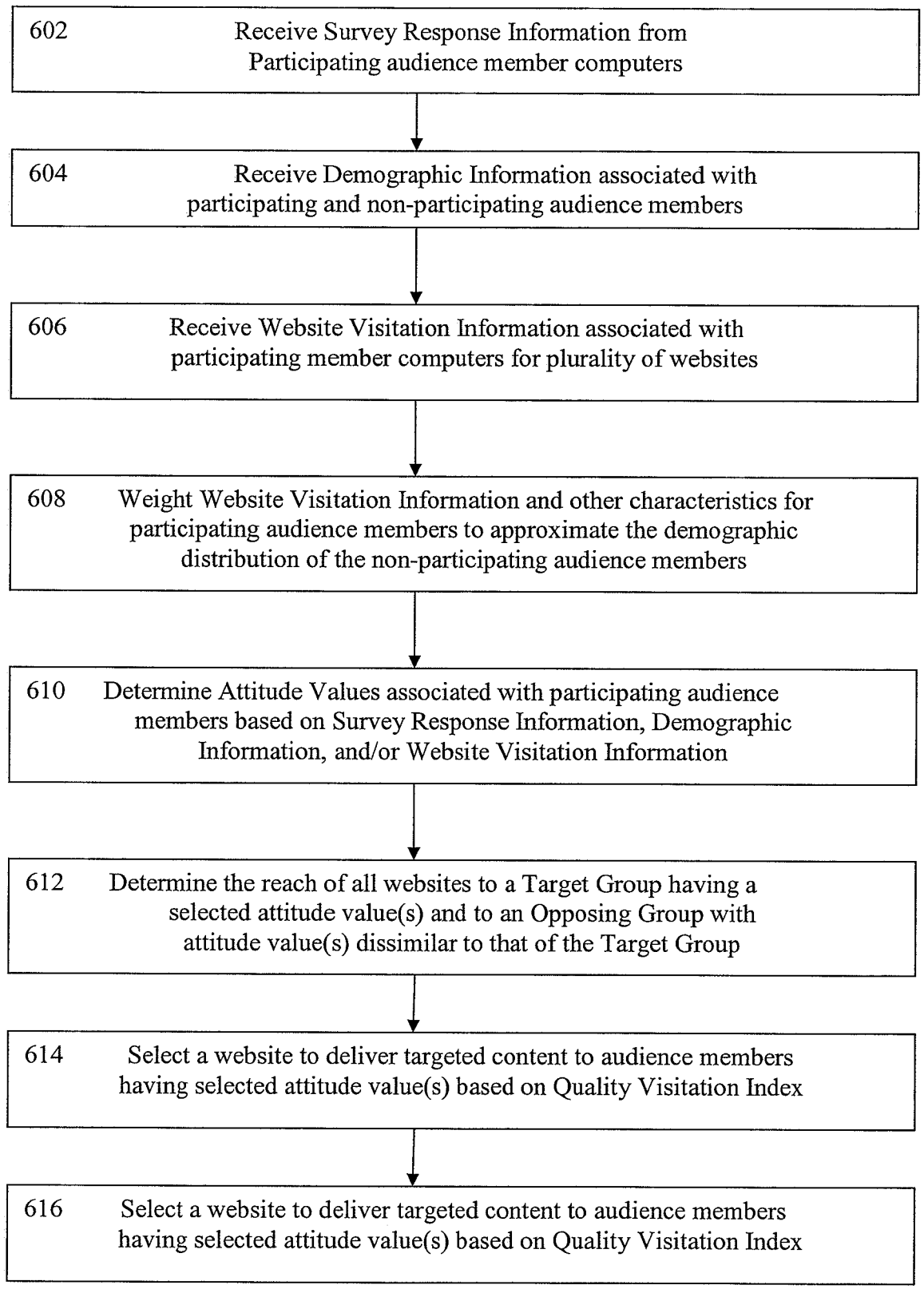
FIG. 2 is a flow chart illustrating a first method embodiment of the present invention.

With reference to FIGS. 1 and 2, a method in accordance with an embodiment of the present invention may be carried out as follows. The method 600 may be used to select one or more websites to display content on the displays 302 connected to participating and/or non-participating audience member computers 300 and 306. The content may be targeted for display as part of one or more websites which are visited by audience members 304 and 310 who are determined to likely have one or more particular attitudes represented by one or more attitude values.

With reference to FIG. 2, in step 602 the participating audience members 304 may use the participating audience member computers 300 to provide online survey response information 112 to the computer 100. The online survey response information 112 may be provided as the result of a participating audience member 304 using the associated participating audience member computer 300 to request the online survey, or as a result of the computer 100, or alternatively some other computer, directing an unsolicited online survey to a participating audience member computer 300. The computer 100 may store the survey response information 112 in the central database 110, and associate the survey response information for a particular participating audience member 304 with an anonymous identifier for the particular participating audience member computer 300 and/or the particular participating audience member 304.

Preferably, but not necessarily, survey response information 112 may be collected from at least 1,000 participating audience member computers 300, more preferably from at least 3,000 participating audience member computers, and most preferably from 4,000 or more participating audience member computers. It is also preferable to receive survey response information 112 from the participating audience member computers 300 over the course of multiple survey "waves" separated in time. Preferably, the survey "waves" are received more than a day apart, more preferably more than 30 days apart, and most preferably about three or more months apart. It is also preferable for the participating audience members 304 to provide survey response information 112 in response to more than two survey waves. The survey questions in each of the survey waves may be the same or different.

The survey response information 112 may also include demographic information associated with the participating audience members 304. The participating audience member demographic information which is part of the survey response information 112 may include the following types of information: age, income, gender, census region, race, sexual orientation, education level, religious affiliation, frequency of attendance at religious services, union participation, frequency of Internet use information, and the like. It is appreciated that the foregoing list of demographic information is non-limiting and that embodiments of the present invention may utilize any types of demographic information that relates to audience members.

With renewed reference to FIG. 2, in step 604 demographic information 114 (other than that which may be included in the survey response information 112) may be received by the computer 100 for participating and/or non-participating audience members. The demographic information 114 may be collected for the non-participating audience members 310 and the participating audience members 304 by the one or more third parties, or derived from other sources of online and/or offline information. The third parties may collect or derive the demographic information 114 in any known manner, including, but not limited to tracking the online behavior of the non-participating audience members 310 and/or participating audience members 304. It is appreciated that the demographic information 114 which is associated with non-participating audience members 310 and/or associated with the participating audience members 304 may be collected by the host of the computer 100 instead of by one or more third parties in an alternative embodiment of the present invention.

The demographic information 114 pertaining to a particular participating audience member may be associated with the anonymous identifier for the participating audience member 304 in the central database 110 by the computer 100. Similarly, demographic information 114 pertaining to a particular non-participating audience member may be associated with an anonymous identifier for the non-participating audience member 310 in the central database 110 by the computer 100. Further, the demographic information 114 may be provided multiple times, preferably at least once per wave, and more preferably at least once per month.

The demographic information 114, as it pertains to participating audience members 304, may be stored in the central database 110 so as to be associated with the same anonymous identifier used in connection with the survey response information 112. The demographic information 114, as it pertains to non-participating audience members 310, may not be specific to individual non-participating audience members, but instead descriptive of a large group of online audience members. For example, the demographic information 114 as it pertains to non-participating audience members 310 may be collected for a number of audience members in a common geographic area, such as the United States, or a number of audience members in any other group which may be characterized as having some common affiliation, such as political, income, ethnic, racial, religious, age, gender, or the like. More specifically, in a preferred embodiment of the present invention, the demographic information 114 pertaining to non-participating audience members 310 may be received or stored such that it pertains to individual non-participating audience members defined by age ranges, gender, household income ranges, census regions, and intensity of Internet use (Heavy/medium/light), etc.

With continued reference to FIGS. 1 and 2, in step 606, website visitation information 116 pertaining to the participating audience member computers 300, and potentially pertaining to the non-participating audience member computers 306, may be received by the computer 100. The website visitation information 116 may be collected for the participating audience member computers 300 and the non-participating audience member computers 306 directly by the computer 100, or alternatively from the one or more third party computers 400 and/or associated databases 402. It is appreciated, however, that embodiments of the present invention may be practiced without receiving website visitation information 116 pertaining to the non-participating audience member computers 306.

While it is preferable to track such website visitation information for all participating audience member computers 300 over a period of one to three months or more (i.e., a wave), it is appreciated that, without departing from the intended scope of the present invention, some participating audience member computers may "drop out" of the tracking process and therefore website visitation information for such participating audience member computers may only be available over the course of more than one session, day, or week, as opposed to one to three months.

The website visitation information 116 may be received by the central database 110 from the computer 100 and stored therein. The tracking of the website visitation information 116 may be implemented by using software installed on participating and non-participating audience member computers 300 and 306, by cookies for tracking such information, or any other manner of tracking the online behavior of an audience member.

The website visitation information 116 may include, but is not necessarily limited to, website URL information, website channel visitation information, website page visitation information, session information, online purchase information, search term information, visitation time information, visitation duration information, visitation date information, and website page clutter information. A session is defined by a visit to a website. Internet traffic metrics such as the number of unique visitors to a website, website channel, and/or website page during a time period (i.e., "unique visitors"), number of visits to a website, website channel, and/or website page during a time period (i.e., "visits"), number of website pages for a website that are viewed during a time period (i.e., "pages viewed"), and the number of minutes spent on a website during a time period, may be part of and/or derived from the website visitation information 116. A unique visitor to a website during a time period is defined as an audience member computer that has visited the website one or more times during the time period. If an audience member computer visits the website more than once during the time period, the audience member computer is still counted only as one unique visitor during the time period.

A website channel may fit hierarchically between a website and a website page. An example of a website is MSN.com, and an example of a website channel is the collection of website pages which are accessed from the "Sports" button on the MSN.com home page. References herein to a "website" are intended to be inclusive of a website in its entirety, a website channel, and a website page unless otherwise defined.

Website page clutter information may be based on one or more of: page length, number of advertisements on a page, location of advertisements on a page, percentage of the surface area of a page taken up with advertisements information (e.g., by pixel count), and size of advertisements on a page information. More specifically, website page clutter may take into account the relative number and placement of pixels on a website page that are used to display advertisements as opposed to other content, as well as the prominence of such advertisements as compared with the non-advertising content on the page. For example, any one of the following may correlate with a higher website page clutter value: more advertisements as compared with fewer, smaller advertisements as compared with larger, and top of page advertisements as compared with bottom of the page.

In step 608 of FIG. 2, weight factors may be determined for participating audience members based on a comparison by computer 100 of the demographic information 114 for participating audience members 304 with the demographic information for non-participating audience members 310. The weight factors may be used to weight the website visitation information 116 and other characteristics pertaining to the participating audience members 304 so that the population of participating audience members in terms of demographic groupings by age, gender, etc., projects more closely to the demographic distribution of the overall online population in terms of the same demographic groups in the same time period.

In step 610 of FIG. 2, attitude values associated with the participating audience members 304 may be determined based on the survey response information 112, the demographic information 114 and/or the website visitation information 116. The attitude values may indicate the participating audience member's political attitude, legislative attitude, regulatory attitude, corporate attitude, and/or product attitude.

In step 612, the reach of each website to a target group of participating audience members having a selected attitude value or values, and the reach of all websites to an opposing group of participating audience members having an attitude value or values dissimilar to the selected attitude values of the target group may be determined. The determined reach may indicate the number of participating audience members in the target group and in the opposing group that visit each website.

In step 614 of FIG. 2, one or more websites may be selected to include content which is targeted to the target group and which is not targeted to the opposing group based on a comparison of the reach of the website to the target group with the reach of the website to the opposing group. In one example, it may be preferred to select a website for delivery of targeted content which has the largest differential in terms of reach between the target group and the opposing group.

In step 616 of FIG. 2, the targeted content may be displayed by the participating and non-participating audience member computers 300 and 306 as a result of the computers visiting the website or websites selected in step 614.

The weight factors referenced in connection with step 608 of FIG. 2 may be determined using the method illustrated in FIGS. 10A and 10B. With reference to FIGS. 10A and 10B, in step 800, each participating audience member in a selected analysis period and in the same demographic group (e.g., age group) may be assigned an equal initial weight value. The analysis period may be any period of time over which website visitation information is available for the participating audience members 304. Preferably the analysis period will be more than one month, and more preferably at least about 3 months. The method illustrated in FIGS. 10A and 10B is preferably carried out for each month's worth of information in the analysis period.

In step 801 of FIG. 10A, the demographic distribution by percentage of the participating audience members 304 in terms of age group may be determined by the computer 100 from the demographic information 114. Examples of age groups in years are 18-24, 25-34, 35-44, 45-54, 55-64, and 65 and over. It is appreciated that other age groups could be used without departing from the intended scope of the present invention. In step 802, the demographic distribution by percentage in terms of age group of the online population for a geographic region such as the United States may be determined by the computer 100 from the demographic information 114. The online population is comprised almost entirely, if not entirely, of the non-participating audience members 310, but may include to some small degree the participating audience members 304 as well. In step 804, an age weight factor may be calculated using the computer 100 by dividing the demographic distribution of the online population in terms of age group by the demographic distribution of the participating audience members 304 in terms of a corresponding age group. For example, for the age group 18-24, an age weight factor may be calculated by dividing the demographic distribution by percentage of the online population in the 18-24 year old range by the demographic distribution by percentage of the participating audience members 304 in the same age range. The age weight factor may be stored by the computer 100 in the central database 110.

In step 806 of FIG. 10A, the demographic distribution by percentage of the participating audience members 304 in terms of gender group may be determined by the computer 100 from the demographic information 114. Examples of gender groups are male and female. In step 808, the demographic distribution by percentage in terms of gender group of the online population may be determined by the computer 100 from the demographic information 114. In step 810, a gender weight factor may be calculated using the computer 100 by dividing the demographic distribution in terms of gender of the online population by the demographic distribution of the participating audience members 304 in terms of a corresponding gender group. The gender weight factor may be stored by the computer 100 in the central database 110.

In step 812 of FIG. 10A, the demographic distribution by percentage of the participating audience members 304 in terms of household income group may be determined by the computer 100 from the demographic information 114. Examples of household income groups are: under $25,000, $25,001-$50,000, $50,001-$75,000, etc. In step 814, the demographic distribution by percentage in terms of household income group of the online population may be determined by the computer 100 from the demographic information 114. In step 816, a household income weight factor may be calculated using the computer 100 by dividing the demographic distribution in terms of household income of the online population by the demographic distribution of the participating audience members 304 in terms of a corresponding household income group. The household income weight factor may be stored by the computer 100 in the central database 110.

In step 818 of FIG. 10A, the demographic distribution by percentage of the participating audience members 304 in terms of census region may be determined by the computer 100 from the demographic information 114. In step 820, the demographic distribution by percentage in terms of census region of the online population may be determined by the computer 100 from the demographic information 114. In step 822, a census region weight factor may be calculated using the computer 100 by dividing the demographic distribution in terms of census region of the online population by the demographic distribution of the participating audience members 304 in terms of a corresponding census region. The census region weight factor may be stored by the computer 100 in the central database 110.

In step 824 of FIG. 10A, the demographic distribution by percentage of the participating audience members 304 in terms of Internet use during a period of time (Heavy/medium/light) may be determined by the computer 100 from the demographic information 114. Examples of Internet use groupings are: Heavy—more than 3430 minutes per month; light—less than 300 minutes per month; and medium—everyone else. In step 826, the demographic distribution by percentage in terms of Internet use of the online population may be determined by the computer 100 from the demographic information 114. In step 828, an Internet use weight factor may be calculated using the computer 100 by dividing the demographic distribution in terms of Internet use of the online population by the demographic distribution of the participating audience members 304 in terms of a corresponding Internet use grouping. The Internet use weight factor may be stored by the computer 100 in the central database 110.

In steps 830-848, each of the subroutines pertaining to determination of the age group, gender group, household income group, census region, and Internet use groupings set forth in steps 801-828 may be repeated until the multiplication of the determined weight factor by the corresponding demographic distribution by percentage of the participating audience members 304 results in a product that is approximately the same as the demographic distribution by percentage of the online population of the same demographic metric. For example, steps 830-848 are repeated iteratively until the multiplication of the age group weight factor by the demographic distribution by percentage in terms of age of the participating audience members 304 results in a product that is approximately the same as the demographic distribution by percentage of the online population in terms of age. The process is further iterated until the resulting demographic distributions on a demographic category-by-category basis are also approximately the same for each demographic category such as gender, household income, census region, and Internet use. Values are considered to be "approximately the same" in the foregoing steps when continued iteration of the process does not result in any substantial change to the values from one iteration to the next. It should also be appreciated that the selection of the demographic information 114 used in the foregoing example is considered to be non-limiting of the present invention. Fewer, more, and/or different demographic information 114 may be used in steps 801-848 without departing from the intended scope of the invention.

Steps 800-848 are repeated for each of a number of individual time periods which may make up the analysis period. Preferably, steps 800-848 are repeated for each month of data that is available for the participating audience members 304. For example, if the analysis period is a three month period, steps 800-848 may be carried out three times to generate three sets of weight factors corresponding each individual month's demographic distributions.

In step 850 of FIG. 10A, for each participating audience member 304 for each preselected time period, the computer 100 may sum the weight factors determined in steps 801-848 across each time period (e.g., month) in the analysis period and across all weight factors as they apply to each particular participating audience member. The resulting sum may be stored in the central database 110 in association with the anonymous identifier for the participating audience member. For example, for a 20 year old, male participating audience member who earns $45,000 per year, lives in the Northeast U.S., and uses the Internet 500 minutes per month, the computer 100 may sum the 18-24 year old group, male gender group, $25,001-$50,000 household income group, Northeast U.S. census region, and medium Internet use weight factors calculated for each of three months of demographic information, and store such sum in association with the anonymous identifier for the participating audience member in the central database 110.

In step 852, the size of the total online population for the analysis period may be determined by the computer 100 from the demographic information 114. For example, if the online population was 160 million individuals in month one, 170 million individuals in month two, and 180 million individuals in month three of the analysis period, the total online population for the analysis period would be 510 million online users.

In step 854, the computer 100 may calculate a projection factor for each participating audience member 304, which is the quotient of the size of the online population determined in step 852 divided by the sum of the weights calculated in step 850. In step 856, a projection weight for each participating audience member 304 may be calculated using the computer 100 by multiplying the weight assigned to the particular participating audience member in step 800 by the projection factor calculated in step 854.

Figure 11:
FIGS. 11A, 11B, and 11C are flow charts illustrating a method of determining Quality Visitation Index values which may be used in accordance with a method embodiment of the present invention.
Figure 11B:
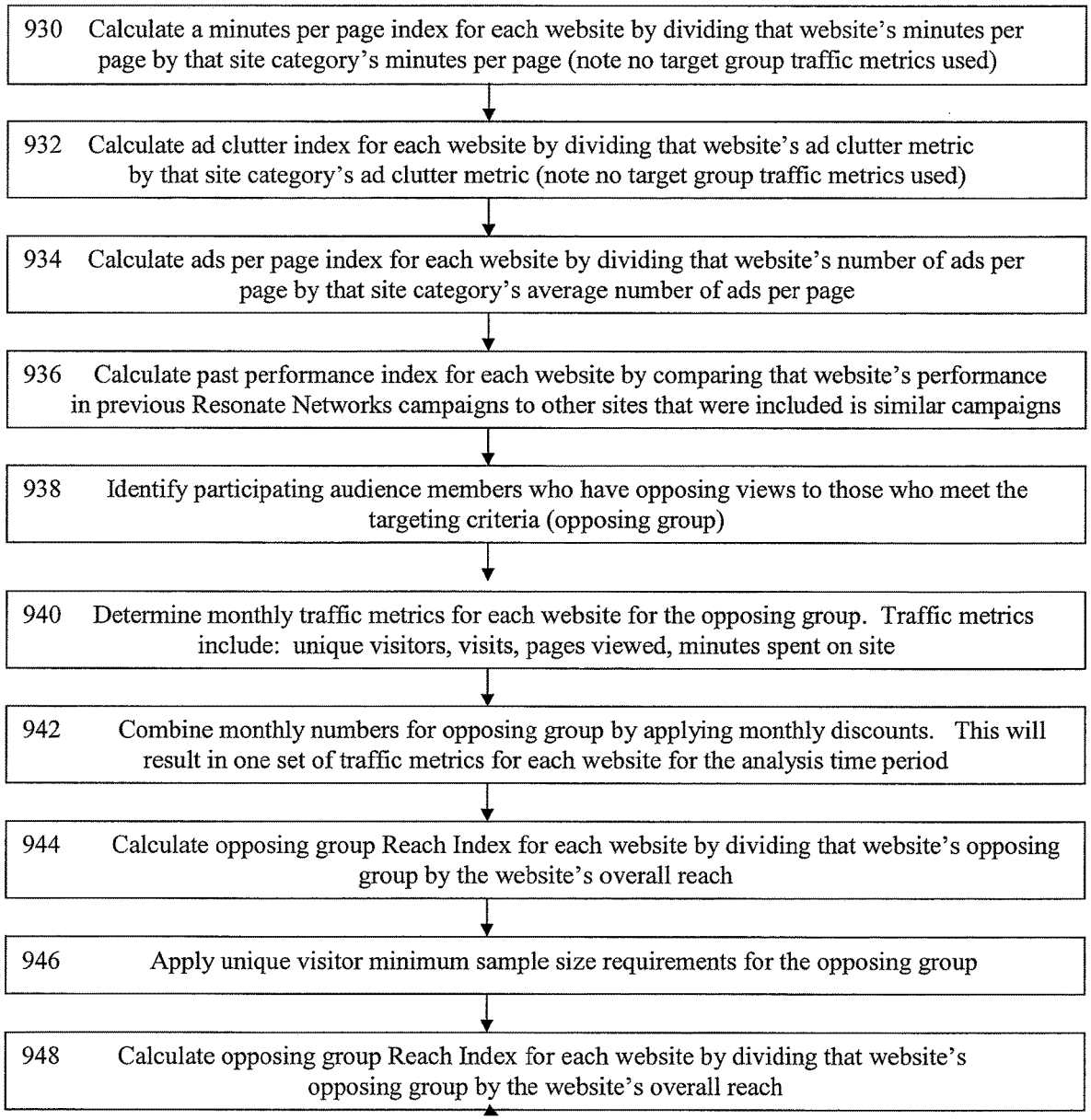
Figure 11C:
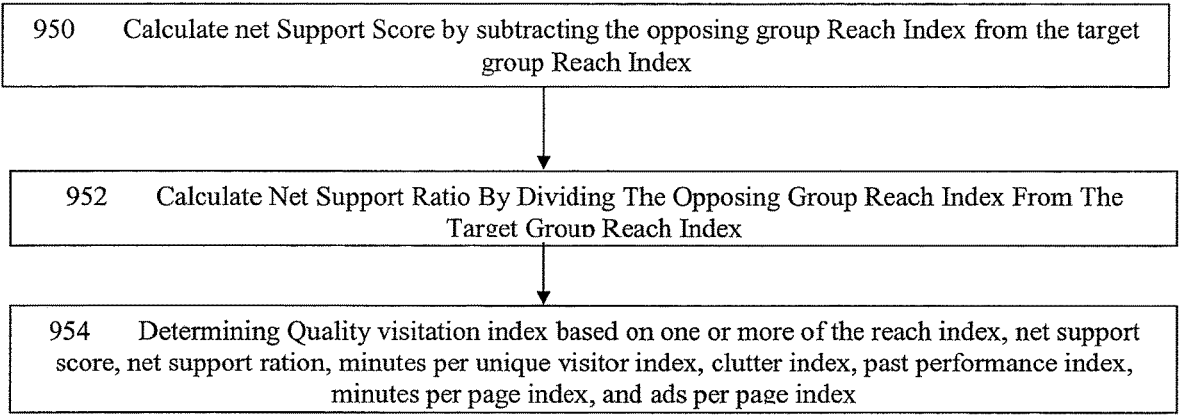

The projection factors for the participating audience members 304 which were determined as a result of carrying out the process set forth in FIGS. 10A-10B may be utilized in a the process shown in FIGS. 11A and 11B to determine a Quality Visitation Index (QVI) value, which in turn is used to determine which website(s) may be selected to deliver targeted content to the participating and non-participating audience members. With reference to FIG. 11A, in step 900 an analysis period is selected which should preferably be the same analysis period used in connection with the process set forth in FIGS. 10A-10B.

In step 902, the projection factors for the participating audience members 304 may by applied by the computer 100 to the website visitation information and other characteristics associated with the participating audience members to produce projected website visitation information and projected characteristic information. "Projected" information, essentially scales up or down the information related to an individual participating audience member so that the information relating to a particular participating audience member is proportional to the make up of the demographic groups (by age, gender, etc.) that the participating audience member is a part of. For example, the projection factor for a particular participating audience member 304 may be multiplied by the following website visitation information 116 that pertains to the same participating audience member for the analysis period: number of visits to websites; number of minutes spent on websites, channels, and/or pages; number of sessions; number of online purchases; and website visitation duration.

In step 904, the computer 100 may determine the projected monthly traffic metrics for each website visited by one or more participating audience members for each month in the analysis period using the website visitation information 116. The traffic metrics determined for each website may include, but are not necessarily limited to: the number of unique visitors; the number of visits; the number of pages viewed; which pages were viewed; the amount of time (e.g., number of minutes) spent visiting the website; number of advertisements per page; and percentage of the surface area of a page taken up by advertisements. The determination of the traffic metrics for a website may be influenced by the projection factors referenced above. For example, if a single participating audience member 304 has a projection factor of "2", and the participating audience member spent 10 minutes visiting a website, it may be counted as spending 20 minutes visiting the website due to the projection factor.

In step 906, the projected monthly traffic metrics determined in step 904 may be combined (i.e., summed) by the computer 100. Discount factors may be applied to the monthly traffic metrics before combining them to account for the decreased value of traffic metrics that pertain to an earlier month. For example, if the analysis period consists of the preceding three months of traffic metrics, the traffic metrics for the first month in the analysis period may be multiplied by a discount factor of 0.5, and the traffic metrics for the second month may be multiplied by a discount factor of 0.75. The foregoing examples of discount factors are illustrative only, and not considered limiting to the intended scope of the present invention. The combined monthly traffic metrics may be stored in the central database 110 by the computer 100.

In step 908, the overall reach of each website visited by one or more participating audience members 304 may be calculated by the computer 100 using the website visitation information 116. The overall reach may be the quotient of the number of projected participating audience member unique visits to the website divided by the total number of projected participating audience members for the analysis period. The overall reach of each website may be stored by the computer 100 in the central database 110.

In step 910, the computer 100 may determine the projected number of minutes spent visiting each website per projected participating audience member unique visitors (min/UV) using the website visitation information 116. The (min/UV) for each website may be stored by the computer 100 in the central database 110.

In step 912, the computer 100 may determine the number of participating audience members 304 that were unique visitors to each website using the website visitation information 116. The number of unique visitors for each website may then be compared with a threshold number of unique visitors that is required for the website to be further considered for delivery of targeted content. For example, if a website had only 40 unique visitors during the analysis period and the threshold value is 50 unique visitors during the analysis period, the computer 100 would determine that the subject website should not be considered further for the delivery of targeted content. The computer 100 may store an indication in the central database 110 of which websites are and/or are not to be considered further for the delivery of targeted content.

In step 914, the computer 100 may determine which of the participating audience members qualify as being in the target group of participating audience members to which the targeted content is to be directed. The target group of participating audience members may be determined by using the computer 100 to determine one or more attitude values for each of the participating audience members. The determined attitude values for the participating audience members may then be compared by the computer 100 with a selected attitude value threshold and/or an attitude value range. If the attitude value for a particular participating audience member satisfies the selected attitude value threshold and/or range, then the participating audience member may be indicated to be part of the target group by the computer 100.

Figure 3:
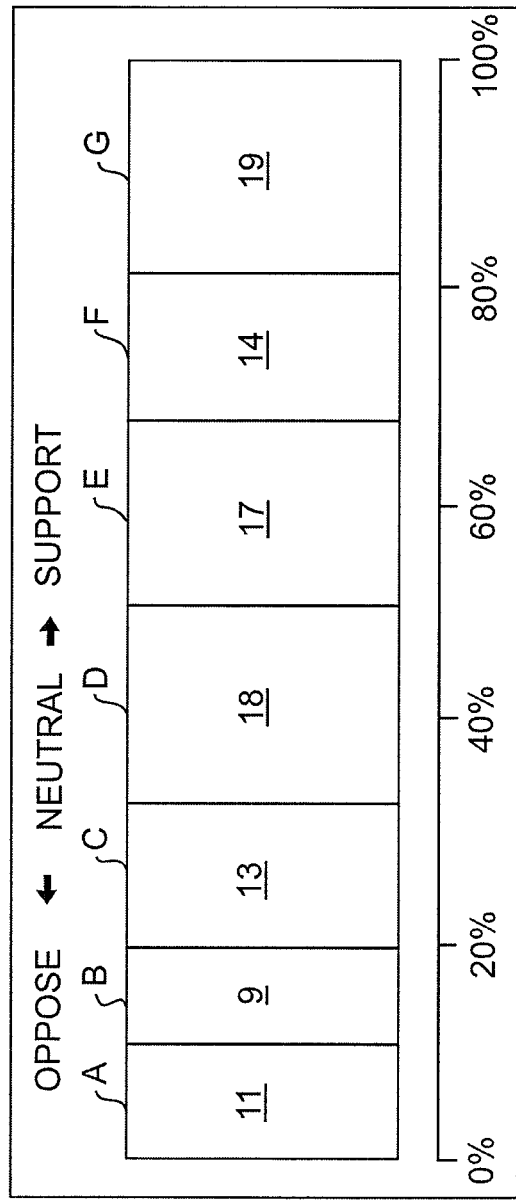
FIG. 3 is a slide showing an example issue question included in an online survey and example online survey response options and response tally in accordance with an embodiment of the present invention.

The survey response information 112 may be used to determine an attitude value for a participating audience member 304 either directly or indirectly. For example, with reference to FIG. 3, the survey response information 112 may include the responses of the participating audience members 304 to an issue question 700 concerning government regulation of nuclear power plants. The participating audience members 304 may use the participating audience member computers 300 to indicate their attitude about such regulation by selecting one of the attitudes provided in the menu 702 which range from "strongly oppose" to "strongly support." The survey response information 112 for a particular issue may result in a tally 704 which is graphically represented in FIG. 3 to indicate the percentage number of participating audience members 304 who characterized themselves as having each of the corresponding attitudes. The survey response information 112 of each participating audience member 304 relating to each issue question 700 may be stored in the central database 110.

With additional reference to FIG. 4, in addition to answers to the issue questions 700, the survey response information 112 may further include answers to political orientation questions 710, level of engagement questions 720, and voting history/party affiliation questions 730. Political orientation questions 710 are more general in character than issue questions 700. An example of an issue question is provided in FIG. 3, as compared with the following examples of political orientation questions 710:

Are you opposed to government regulation of business?
Are you opposed to government provided healthcare?

Examples of voting history/party affiliation questions 730 may include:

How often do you vote?
What elections do you normally participate in as a voter?
What political party or parties are you a member of?

The foregoing examples of issue questions 700, political orientation questions 710 and voting history/party affiliation questions 730 are intended to be illustrative and non-limiting of the intended scope of the present invention. It is appreciated that one or more of these types of questions (i.e., issue, political orientation, and voting history/party affiliation) may not be included in the survey response information 112 without departing from the intended scope of the present invention.

Additionally, level of engagement questions 720 which may be included in the survey response information 112 may be used to determine one or more level of engagement values for each participating audience member 304 on one or more engagement scales illustrated by FIGS. 5-9. The three engagement scales illustrated in FIGS. 5-9 are a general engagement scale, a political engagement scale, and an advocacy engagement scale. The number and type of engagement scales, as well as the associated definitions, levels and values used in connection with the scales are considered to be illustrative only and non-limiting of the invention which may be carried out without any engagement scales whatsoever.

With additional reference to FIG. 5, the survey response information 112 may indicate that a particular participating audience member 304 has taken one or more of the general engagement actions 722 listed in FIG. 5. Each of the illustrative general engagement actions 722 may be associated with an action value shown in the left column of chart 724 by the computer 100. The computer 100 may compare the survey response information 112 for each participating audience member 304 with the actions 722 to determine the general engagement levels in the chart 726 shown in FIG. 6 that should be attributed to the participating audience member. The action values that the survey response information 112 indicates should be attributed to a participating audience member 304 may be added together by the computer 100 to aggregate a cumulative general engagement value. With reference to FIG. 6, each of four illustrative general engagement value ranges 726 are illustrated, ranging from "non-engaged" which is associated with a cumulative general engagement value of 0 to a "high" level of engagement associated with a cumulative general engagement value in the range of 13-38. The cumulative general engagement value for each participating audience member 304 may be stored by the computer 100 in the central database 110 in association with the anonymous identifier for the participating audience member.

With reference to FIG. 7, the survey response information 112 may further indicate that a particular participating audience member 304 satisfies one or more of the political engagement definitions 730 shown in chart 728. Based on a comparison of the survey response information 112 with the definitions 730 by the computer 100, the participating audience member 304 may be associated with one of the political engagement levels 732 and associated political engagement values 734 on the illustrative political engagement scale. As indicated in the chart 728, the political engagement levels 732 and associated values 734 may be hierarchal such that a participating audience member 304 must satisfy the requirements of the preceding lower level in order to be eligible to satisfy the definition 730 of the next higher level. The political engagement value 734 for each participating audience member 304 may be associated with the anonymous identifier for the participating audience member by the computer 100 in the central database 110.

With reference to FIG. 8, the survey response information 112 may further indicate that a particular participating audience member 304 has taken one or more of the advocacy engagement actions shown in the chart 736. In the illustrative example shown, each advocacy engagement action may be placed in one of four groups: private actions 738, active involvement actions 740, integrated political actions 742, and public/high level involvement actions 744. With reference to FIGS. 8 and 9, a particular participating audience member 304 may be associated with one of the advocacy engagement levels 748 and corresponding advocacy engagement values 750 shown in the chart 746 based on a comparison implemented by the computer 100 between (i) the advocacy engagement actions indicated in the participating audience member's survey response information 112 and (ii) the advocacy engagement level descriptions 752. The advocacy engagement value 750 corresponding to the advocacy engagement level 748 that the participating audience member 304 qualifies for may be associated by the computer 100 with the anonymous identifier for the participating audience member in the central database 110.

With renewed reference to FIGS. 6-9, one or more of the cumulative general engagement values 726, the political engagement values 734, and the advocacy engagement values 750 may be used in the determination of the attitude value 118 for each participating audience member. Determination of the attitude value 118 may be further based on website visitation information 114 and/or demographic information 116. Preferably, the attitude value information 118 is determined from the combination of survey response information 112, the website visitation information 116, and the demographic information 114 associated with the particular participating audience member computer 300.

With renewed reference to FIG. 11A, in step 916, the computer 100 may determine the projected monthly traffic metrics for each website visited by the participating audience members 304 in the target group for each month in the analysis period using the website visitation information 116. The traffic metrics determined for each website may include the same metrics as referenced in connection with step 904, and may be influenced by the projection factors in the same manner as in step 904.

In step 918, the projected monthly traffic metrics determined in step 916 may be combined (i.e., summed) by the computer 100 in the same manner as set forth in connection with step 906. Discount factors may be applied to the monthly traffic metrics before combining them to account for the decreased value of traffic metrics that pertain to an earlier month. The combined projected monthly traffic metrics may be stored in the central database 110 by the computer 100.

In step 920, the target group reach of each website visited by the participating audience members 304 in the target group may be calculated by the computer 100 using the website visitation information 116. The target group reach may be the quotient of the number of projected unique visitors to the website audience members in the target group divided by the total number of projected participating audience members in the target group for the analysis period. The target group reach of each website may be stored by the computer 100 in the central database 110.

In step 922, the computer 100 may determine the number of minutes spent visiting each website per projected participating audience member unique visitor in the target group (target group min/UV) using the website visitation information 116. Alternatively, or in combination with the target group min/UV, the computer 100 may determine website pages/UV. The target group min/UV may be determined by totaling the number of minutes spent visiting a website by all of the projected participating audience member computers associated with the target group divided by the number of participating audience member unique visitors who are in the target group. The target group pages/UV may be determined by totaling the number of pages visited by all of the projected participating audience member computers associated with the target group divided by the number of participating audience member unique visitors who are in the target group.

In step 924, the computer 100 may determine the number of participating audience members 304 in the target group that were unique visitors to each website using the website visitation information 116. The number of participating audience members 304 in the target group who were unique visitors for each website may then be compared with a threshold number of unique visitors that is required for the website to be further considered for delivery of targeted content in the same manner as set forth in connection with step 912. The computer 100 may store an indication in the central database 110 of which websites are and/or are not to be considered further for the delivery of targeted content based on the outcome of this step.

In step 926, the computer 100 may calculate a target group Reach Index for each website still under consideration for use in the delivery of targeted content. The target group Reach Index may be the quotient of the target group reach for each website determined in step 920 divided by the overall reach of each website determined in step 908. The target group Reach Index may be stored by the computer 100 in the central database 110.

In step 928, the computer 100 may calculate a minutes per unique visitor Index for each website still under consideration for use in the delivery of targeted content. The minutes per unique visitor Index may be the quotient of the number of minutes spent visiting each website per projected participating audience member unique visitor in the target group determined in step 922 divided by the number of minutes spent visiting each website per projected participating audience member unique visitor determined in step 910. The minutes per unique visitor index and/or the pages per unique visitor index may be restrained to a predefined range, 0.7 to 1.3 in a preferred embodiment. The target group min/UV and/or target group pages/UV for each website may be stored by the computer 100 in the central database 110.

The minutes per unique visitor Index may be stored by the computer 100 in the central database 110.

In step 930, the computer 100 may calculate a minutes per page Index for each website still under consideration for use in the delivery of targeted content. The minutes per page Index may be the quotient of the average number of minutes per page for participating audience members 304 on a website divided by the average number of minutes per page for participating audience members on all websites in the same website category. For example, if the website under consideration is CNN.com, the average number of minutes per page that the participating audience members 304 spent on CNN.com would be divided by the average number of minutes per page that the online population spent visiting all news-related websites. The minutes per page Index may be restrained to a predefined range, 0.7 to 1.3 in a preferred embodiment. The minutes per page Index may be stored by the computer 100 in the central database 110.

In step 932, the computer 100 may calculate an advertisement (ad) clutter Index for each website still under consideration for use in the delivery of targeted content. The ad clutter Index may be the quotient of an ad clutter metric for a website divided by an ad clutter metric associated with other websites in the same website category. For example, the ad clutter metric(s) used may be an indication of the location of advertisements on a page, the size of advertisements on a page and/or the number of pixels dedicated to advertisements on a page. The ad clutter Index may be stored by the computer 100 in the central database 110.

In step 934, the computer 100 may calculate an advertisements (ads) per page Index for each website still under consideration for use in the delivery of targeted content. The ads per page Index may be the quotient of the average number of ads per page on the website under consideration divided by the average number of ads per page on other websites in the same website category. The ads per page Index may be stored by the computer 100 in the central database 110.

In step 936, the computer 100 may calculate a past performance Index for each website still under consideration for use in the delivery of targeted content. The past performance Index may be the quotient of a metric used to measure the past performance of a website used in an advertising campaign divided by a metric used to measure the performance of all other or a collection of other websites used in similar advertising campaigns. Examples of past performance metrics may include, but are not limited to click through rates and conversion rates, where a "conversion" may be a purchase, a donation, contacting a politician, or joining an online community. The past performance Index may be stored by the computer 100 in the central database 110.

In step 938, the computer 100 may determine which of the participating audience members qualify as being in an opposing group of participating audience members to which the targeted content is not to be directed. The opposing group may be defined as having attitude values which are the most dissimilar to those of the target group referenced in connection with step 914. As with the target group, the opposing group of participating audience members may be determined by using the computer 100 to determine one or more attitude values for each of the participating audience members. The determined attitude values for the participating audience members may then be compared by the computer 100 with a selected opposing attitude value threshold and/or an attitude value range. If the attitude value for a particular participating audience member satisfies the selected opposing attitude value threshold and/or range, then the participating audience member may be indicated to be part of the opposing group by the computer 100.

In step 940, the computer 100 may determine the projected monthly traffic metrics for each website visited by the participating audience members 304 in the opposing group for each month in the analysis period using the website visitation information 116. The projected traffic metrics determined for each website may include the same metrics as referenced in connection with step 904, and may be influenced by the projection factors in the same manner as in step 904. The projected monthly traffic metrics for each website visited by the participating audience members 304 in the opposing group, as well as in the target group, may be stored by the computer 100 in the central database 110.

In step 942, the projected monthly traffic metrics determined in step 940 may be combined (i.e., summed) by the computer 100 in the same manner as set forth in connection with step 906. Discount factors may be applied to the monthly traffic metrics before combining them to account for the decreased value of traffic metrics that pertain to an earlier month. The combined monthly traffic metrics may be stored in the central database 110 by the computer 100.

In step 944, the opposing group reach of each website visited by the participating audience members 304 in the opposing group may be calculated by the computer 100 using the website visitation information 116. The opposing group reach may be the quotient of the number of projected unique visitors to the website by projected participating audience members in the opposing group divided by the total number of projected participating audience members in the opposing group for the analysis period. The opposing group reach of each website may be stored by the computer 100 in the central database 110.

In step 946, the computer 100 may determine the number of participating audience members 304 in the opposing group that were unique visitors to each website using the website visitation information 116. The number of participating audience members 304 in the opposing group who were unique visitors for each website may then be compared with a threshold number of unique visitors that is required not to be surpassed in order for the website to be further considered for delivery of targeted content in the same manner as set forth in connection with step 912. The computer 100 may store an indication in the central database 110 of which websites are and/or are not to be considered further for the delivery of targeted content based on the outcome of this step.

In step 948, the computer 100 may calculate an opposing group Reach Index for each website still under consideration for use in the delivery of targeted content. The opposing group Reach Index may be the quotient of the opposing group reach for each website determined in step 944 divided by the overall reach of each website determined in step 908. The opposing group Reach Index may be stored by the computer 100 in the central database 110.

In step 950, a Net Support Score (NSS) may be calculated by the computer 100 by subtracting the opposing group Reach Index from the target group Reach Index or more preferably by dividing the opposing group Reach Index by the target group Reach Index. The Net Support Score may be used to identify websites for the delivery of targeted content which are (i) more likely to be visited by participating and non-participating audience members 304 and 310 who have attitude values (i.e., attitudes) that are similar to those of the target group, and (ii) less likely to be visited by participating and non-participating audience members who have attitude values (i.e., attitudes) that are similar to those of the opposing group. The NSS for each website may be ranked by the computer to identify those websites which are more favorable for the delivery of targeted content to participating and non-participating audience members. An example of the ranking of websites by a NSS value is shown in FIG. 12. The NSS for each website and an indication of the ranking of each website may be stored by the computer 100 in the database 110.

In an alternative embodiment, the NSS may be calculated by multiplying the opposing group Reach Index by a minutes per unique visitor Index for the opposing group, and then subtracting or dividing the result from result of the target group Reach Index multiplied by a minutes per unique visitor Index for the target group. The minutes per unique visitor Index for the target group may be determined by the computer 100 as stated in connection with step 922, above. The minutes per unique visitor Index for the opposing group may be determined by the computer 100 using the website visitation information 116 in the same manner as set forth for the target group in step 922 The (target group min/UV) for each website may be stored by the computer 100 in the central database 110.

In step 952, a Quality Visitation Index (QVI) value may be determined for each website by the computer 100 based on one or more of the target group Reach Index, opposing group Reach Index, NSS, minutes per unique visitor Index, ad clutter Index, past performance Index, minutes per page Index, and ads per page Index. More specifically, in one embodiment of the present invention one or more of the foregoing indices and the NSS may be multiplied together to produce a QVI value. In another embodiment of the invention, one or more of the indices and the NSS may also be multiplied by a discretionary factor which gives the particular index or the NSS heavier or lighter weight in the QVI determination. In still another embodiment of the invention, the exponential value of one or more of the indices and the NSS may be multiplied together to produce a QVI value.

The QVI value determined in step 952 may be compared with a threshold QVI value, a range of QVI values, or ranked against other QVI values for other websites to determine an optimal website for the delivery of targeted content. Examples of the ranking of websites by QVI values are shown in FIGS. 12 and 13. If the determined QVI value exceeds the threshold QVI value or falls within a prescribed QVI value range, the website in question may be selected for inclusion of content which is believed to be desirable to members of the target group. Alternatively, if the QVI value of a particular website ranks highly as compared to the QVI values of other websites, the website in question may be selected for inclusion of content which is believed to be desirable to members of the target group.

Once a website or websites are selected to be used to deliver the targeted content to the participating and/or non-participating audience members based on the determined QVI value for the website(s), the content may be transmitted to one or more web servers 500 (FIG. 1), and from the one or more web servers over the network 200 to one or more of the audience member computers 300 and/or 306 as a result of the audience member computers visiting the website in question. Thereafter the audience member computers may display the content on an associated display or connected display 302. The content to be transmitted to the web servers 500 may be stored in memory associated with the one or more third party computers 400 or may be stored in memory associated with the computer 100.

It will be apparent to those skilled in the art that variations and modifications of the present invention can be made without departing from the scope or spirit of the invention.

What is claimed is:

1. A method implemented using software stored in non-transitory memory, the software executing on a processor of a computer, the method comprising:

receiving, at a database, survey response information for a plurality of participating audience members, the survey response information transmitted over a computer network from a plurality of computers, each computer from the plurality of computers associated with a participating audience member from the plurality of participating audience members, the plurality of participating audience members from a plurality of audience members;

receiving, at the database, website visitation information for the plurality of participating audience members;

receiving, at the database, demographic information for the plurality of participating audience members;

receiving, at the database, demographic information for a plurality of non-participating audience members, each non-participating audience member from the plurality of non-participating audience being an audience member from the plurality of audience members from whom no survey response information is received;

receiving, from a content provider, targeted content that is of interest to audience members within a target group with a particular attitude;

determining, by a processor, a plurality of attitude values, each attitude value from the plurality of attitude values associated with an attitude for a participating audience member from the plurality of participating audience members, based at least in part on the survey response information and the demographic information;

determining, by the processor, a target group Reach Index for each website from a plurality of candidate websites based on a reach of that website for audience members within the target group;

identifying, by the processor, an opposing group from the participating audience members, the opposing group having attitude values dissimilar to the target group;

determining, by the processor, an opposing group Reach Index for each website from the plurality of candidate websites based on a reach of that website for audience members within the opposing group;

determining, by the processor, a Net Support Score (NSS) for each website from the plurality of candidate websites based on the target group Reach Index and the opposing group Reach Index;

extracting, by the processor, for each website from the plurality of candidate websites website layout information including at least one of: (i) page length, (ii) number of advertisements on that website, (iii) location of advertisements on that website, (iv) percentage of surface area of that website taken up with advertisements information, (v) size of advertisements on that website, (vi) number of pixels on that website that are used to display advertisements relative to number of pixels that are used to display other content, or (vii) prominence of advertisements relative to non-advertising content on that website;

determining, by a processor, Quality Visitation Index (QVI) value for each website from the plurality of candidate websites based on the NSS for that website and a quotient of a metric associated with the website layout information for that website and an average of the metric for the plurality of candidate websites;

selecting, by the processor, a website from the plurality of candidate websites for the delivery of the targeted content based on the QVI value for the website; and delivering the targeted content such that as a result of an audience member from the plurality of audience members accessing the website, a computer of that audience member displays the webpage that incorporates the targeted content.

2. The method of claim 1, wherein the QVI value is further based on at least one of a minutes per unique visitor Index, a pages per unique visitor Index, a past performance Index, or a minutes per page index.

3. The method of claim 1, wherein the QVI value for each website from the plurality of candidate websites is determined at least in part from a comparison of (i) a percentage of participating audience members from the target group that visited that website in a selected time period, and (ii) a percentage of participating audience members that visited that website in the selected time period.

4. The method of claim 3, wherein the percentage of participating audience members from the target group that visited that website in a selected time period is determined based on comparison of (i) a number of participating audience members from the target group that visited that website in the selected time period, and (ii) a number of participating audience members within the target group.

5. The method of claim 1, further comprising associating, in the database and for each participating audience member from the plurality of participating audience members, (i) an attitude value, survey response information, website visitation information, and demographic information with (ii) an anonymous identifier.

6. The method of claim 1 wherein determining a QVI value for each website from the plurality of candidate websites includes weighting website visitation information for that website and the plurality of participating audience members by a factor based on (i) the demographic information associated with the plurality of participating audience members and (ii) the demographic information associated with the plurality of non-participating audience members.

7. The method of claim 1, wherein determining the QVI value for each website from the plurality of candidate websites includes weighting website visitation information for that website and the plurality of participating audience members by a factor based on a time period for which the website visitation information is received.

8. The method of claim 1, wherein determining the QVI value for each website from the plurality of candidate websites includes weighting website visitation information for that website and the plurality of participating audience members by a factor based on an amount of time between when the survey response information is received and the determination of the QVI value.

9. The method of claim 1, wherein determining the QVI value further comprises:
ranking the NSS for each website from the plurality of candidate websites.

10. The method of claim 1, wherein determining the QVI value for each website from the plurality of candidate websites further comprises:
determining that a threshold number of the plurality of participating audience members visited that website in a predetermined period of time.

11. The method of claim 1, wherein determining the QVI value for each website from the plurality of candidate websites further comprises:
determining that a threshold number of audience members within the target group visited that website in a predetermined period of time.

12. The method of claim 1, wherein the website visitation information includes website URL information, website page visitation information, session information, online purchase information, search term information, visitation time information, visitation duration information, and visitation date information.

13. The method of claim 1, wherein an attitude value from the plurality of the attitude values is determined from at least one of level of support for an issue information, or political party affiliation information.

14. The method of claim 1, wherein a participating audience member from the plurality of participating audiences is associated with multiple attitude values.

15. The method of claim 1, wherein an attitude value from the plurality of attitude values is determined from voting history information.

16. The method of claim 1, wherein an attitude value from the plurality of attitude values is determined from political party affiliation information.

17. The method of claim 1, further comprising:
receiving additional survey response information for additional participating audience members more than thirty days after the survey response information for the plurality of participating audience members is received; and
determining an attitude value for the additional participating audience members based on the additional survey response information.

18. The method of claim 1 wherein the computer is a first computer, the method further comprising transmitting the targeted content over the computer network to a second computer associated with a non-participating audience member from the plurality of non-participating audience members as a result of the non-participating audience member accessing the website.

* * * * *